United States Patent [19]
Fraser et al.

[11] 3,888,715
[45] June 10, 1975

[54] METHOD OF INDUCING HIGH FREQUENCY ELECTRIC CURRENT INTO A THERMOSETTING ADHESIVE JOINT

[75] Inventors: Richard S. Fraser, Los Angeles, Calif.; Cecil J. Allison, Jr., Richard W. Caster, Ronald J. McConnel, Roland E. Kribich, Paul Y. Jone, all of Seattle, Wash.

[73] Assignee: Weyerhaeuser Company, Tacoma, Wash.

[22] Filed: Aug. 27, 1973

[21] Appl. No.: 391,706

Related U.S. Application Data

[63] Continuation of Ser. No. 73,926, Sept. 21, 1970, abandoned.

[52] U.S. Cl. ............... 156/273; 156/274; 156/380; 219/10.53; 219/10.81
[51] Int. Cl. ..................... B32b 21/04; B32b 31/20
[58] Field of Search .......... 156/272, 273, 274, 380; 204/155, 156; 219/10.43, 10.53, 10.81

[56] References Cited
UNITED STATES PATENTS

| | | |
|---|---|---|
| 2,393,541 | 1/1946 | Kohler .............................. 156/272 |
| 2,434,573 | 1/1948 | Mann et al. ........................... 264/26 |
| 2,453,185 | 11/1948 | Bilhuber ............................ 156/380 |
| 3,038,511 | 6/1962 | Smith................................. 156/380 |
| 3,396,258 | 8/1968 | Leatherman....................... 156/272 |
| 3,454,442 | 7/1969 | Heller, Jr. ........................... 156/273 |
| 3,461,014 | 8/1969 | James ................................. 156/272 |
| 3,528,867 | 9/1970 | Leatherman et al................ 156/272 |
| 3,574,031 | 4/1971 | Heller, Jr. et al................... 156/272 |
| 3,620,875 | 11/1971 | Guglielmo, Sr. .................... 156/273 |

Primary Examiner—Charles E. Van Horn
Assistant Examiner—M. G. Wityshyn

[57] ABSTRACT

The width of glue line in a laminate that can be economically cured by radio frequency energy is greatly increased by inclusion of a pattern of field control elements within the line. The preferred pattern is one of stripes placed parallel to the electrodes. These stripes can be of metallic foil, flame sprayed metals, metallic paints or inks or semi-conductive materials. The method is also adapted to butt joints or finger joints in lumber items. The product, the method and apparatus are disclosed.

19 Claims, 31 Drawing Figures

INVENTORS,
RICHARD S. FRASER
CECIL J. ALLISON JR.
RICHARD W. CASTER
RONALD J. McCONNEL
ROLAND E. KREIBICH
PAUL Y. JONE
BY
ATTORNEYS

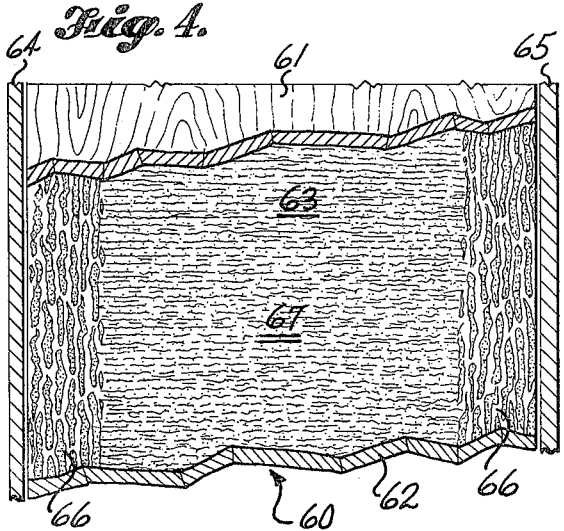
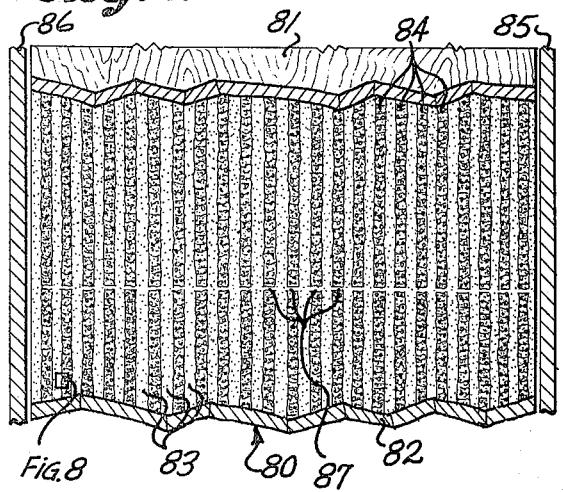
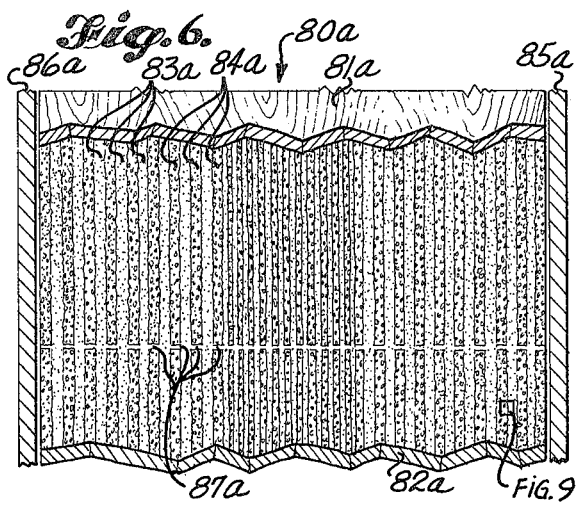
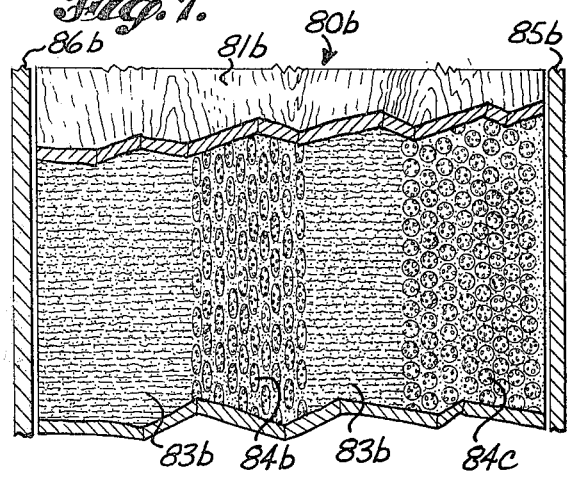
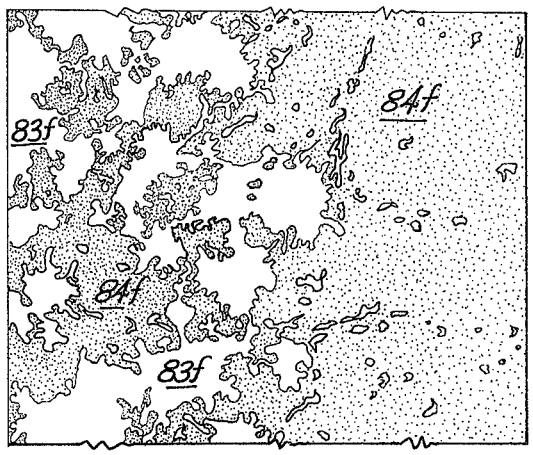
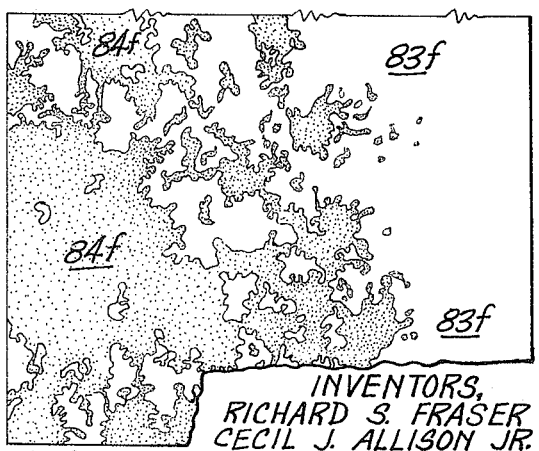

INVENTORS,
RICHARD S. FRASER
CECIL J. ALLISON JR.
RICHARD W. CASTER
RONALD J. McCONNEL
ROLAND E. KREIBICH
BY PAUL Y. JONE

ATTORNEYS

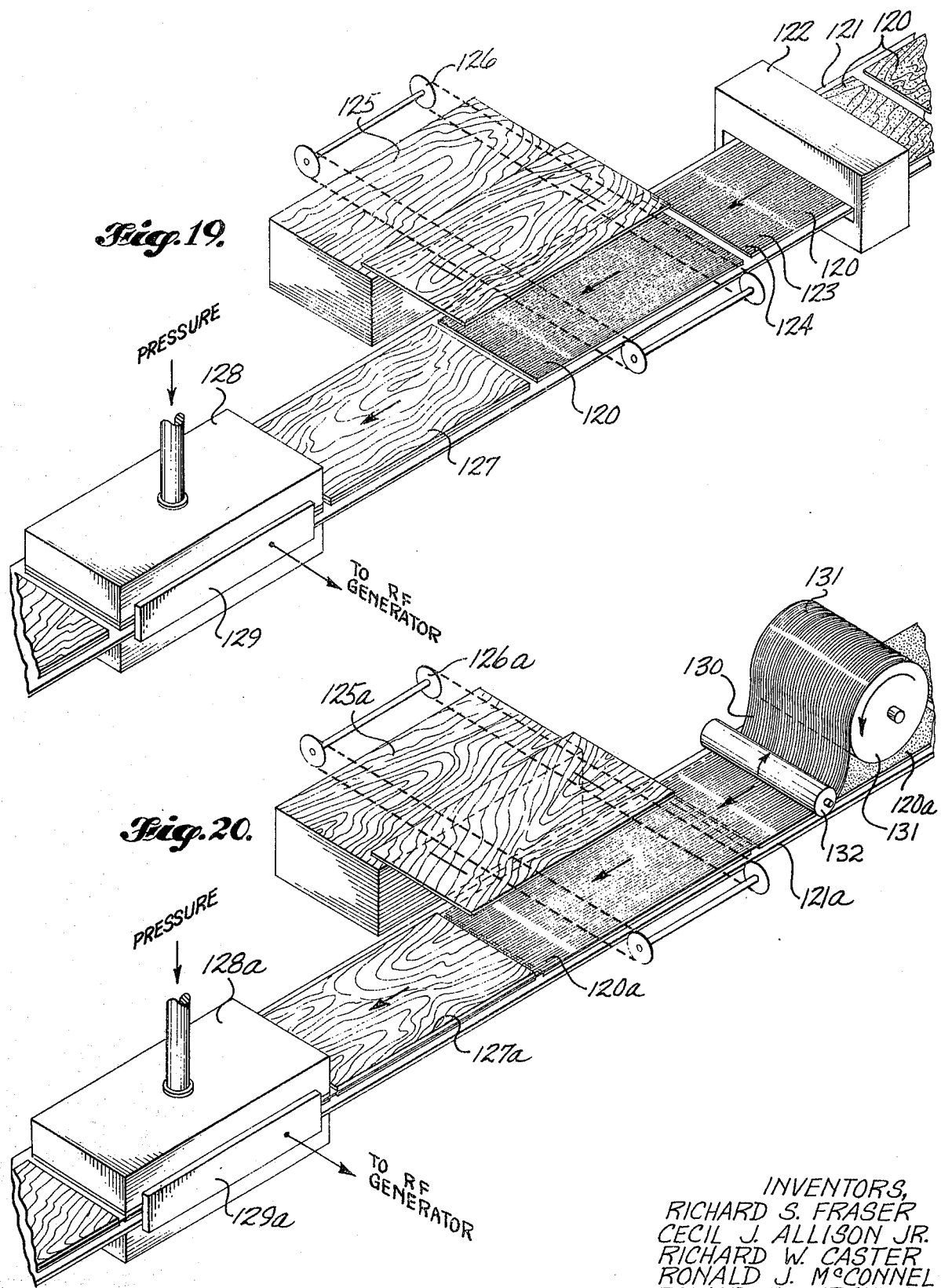

INVENTORS,
RICHARD S. FRASER
CECIL J. ALLISON JR.
RICHARD W. CASTER
RONALD J. McCONNEL
ROLAND E. KREIBICH
PAUL Y. JONE
BY
ATTORNEYS

INVENTOR.
RICHARD S. FRASER
CECIL J. ALLISON JR.
RICHARD W. CASTER
RONALD J. McCONNEL
ROLAND E. KREIBICH
PAUL Y. JONE

BY

ATTORNEYS

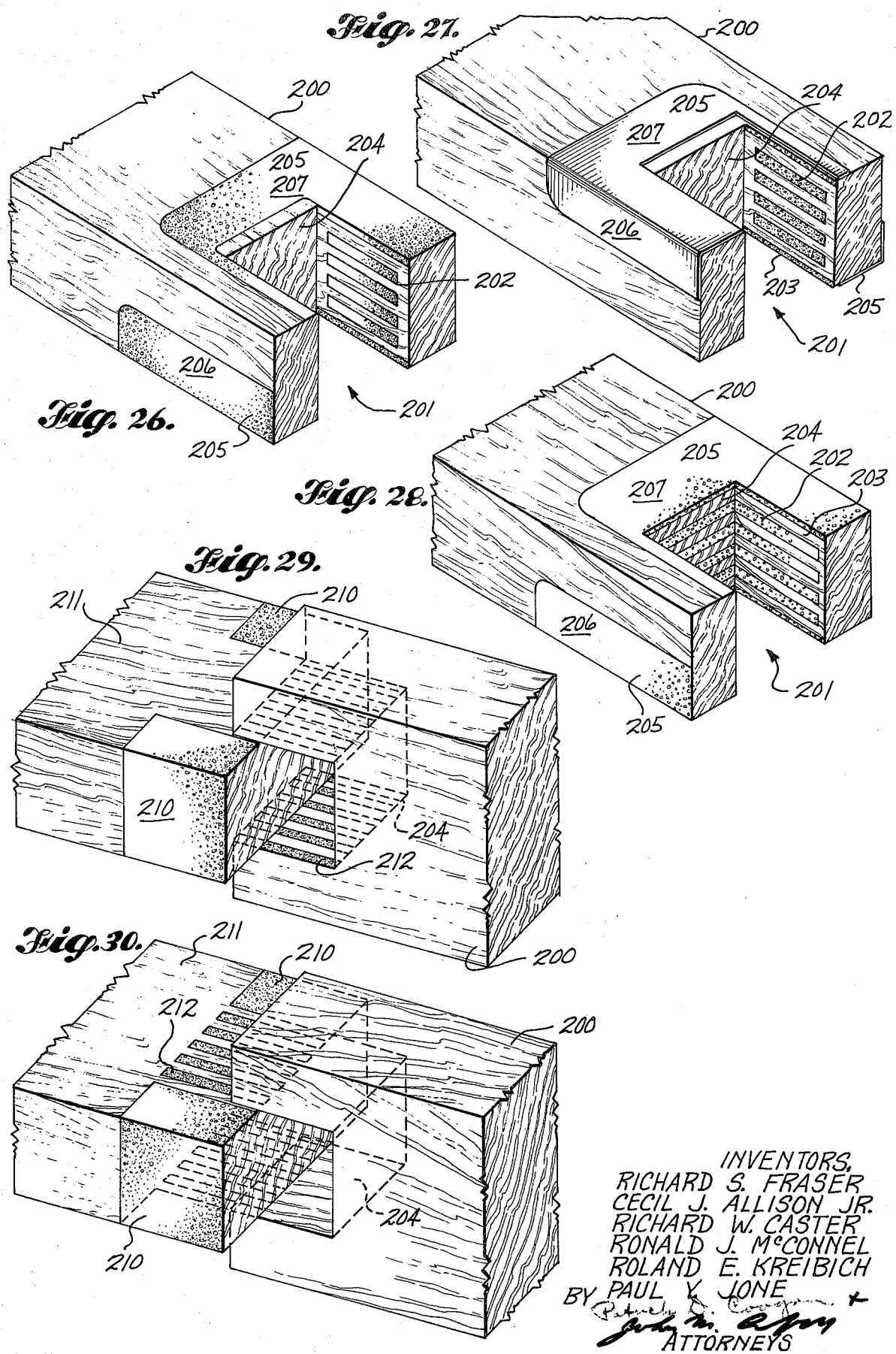

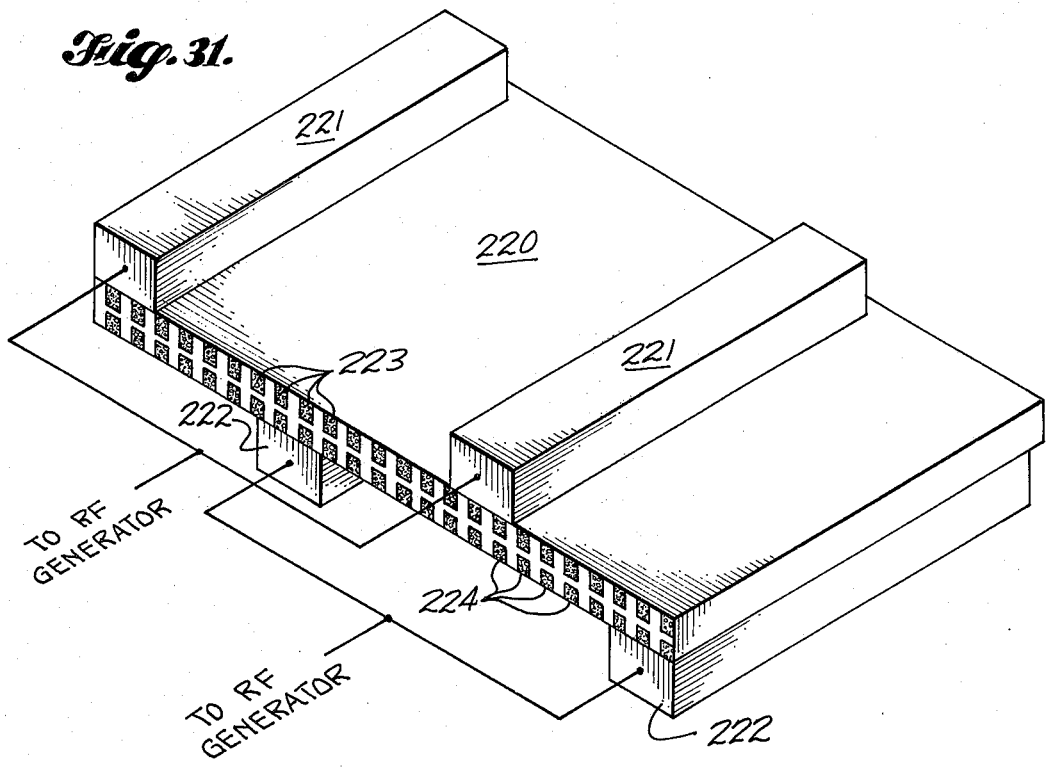

METHOD OF INDUCING HIGH FREQUENCY ELECTRIC CURRENT INTO A THERMOSETTING ADHESIVE JOINT

This is a continuation of application Ser. No. 73,926 filed Sept. 21, 1970, now abandoned.

BACKGROUND OF THE INVENTION

1. Field of the Invention

This invention relates to the control of a radio frequency (RF) field in a dielectric medium and overcomes certain limitations of the present art of RF heating, to the product formed and the apparatus for performing it. It specifically relates to an improved process for bonding wood and lumber products with thermoreactive adhesives using RF energy, the product and the apparatus.

2. Description of the Prior Art

By definition, an electromagnetic field is a region in which forces are observed to be exerted on electrical charges. Electrical charges refer here to the electrons and protons which are constitutional parts of every atom, and include combinations of these molecules, polar and nonpolar, as well as ions. When subjected to forces of the electromagnetic field, these charges move and, by their motion and by their resulting new configuration, change the nature of the field to which they respond.

When electromagnetic energy at radio frequencies is utilized for heating, the heating may be nonuniform because the environment affects the distribution of the energy. This lack of uniformity is usually undesirable because it is uneconomical, inconvenient, and may result in poor quality material. This lack of uniformity may be illustrated by the example of the use of RF energy for heating and curing glue in the production of wood laminates. Wood is only exemplary since the laminates may use any type of material.

In this process it is important that only the glue be heated. Any more heating of the wood than is incidental to its physical contact with the heated glue is unnecessary and uneconomical. However, the establishment of an electromagnetic field in the glue also establishes an electromagnetic field in the wood. This latter field will not only heat the wood but will also influence the distribution and the uniformity of the field in the glue and, hence, influence the heating of the glue.

There are also variable factors in both the wood and glue which influence the distribution and uniformity of the field. Those in the wood include variations in moisture content, variation in density between and within species, variations in cell structure, and inhomogeneities such as pitch pockets, knots and foreign material. Those in the glue include variations in the electrical properties of the glue, variations in the moisture content of the glue, variations in the rate of the chemical reaction involved in the cure throughout the glue, variations in the temperature of the glue, and variations in the thickness of the layer of glue.

In addition to the variations in the wood and in the glue just described, the distribution of the electromagnetic field will be influenced very substantially by the physical arrangements of the electrical conductors which guide the electromagnetic energy from the radio frequency generator to the wood and glue.

In a similar way the presence of other material bodies in and around the material to be heated will effect the distribution of the heating. The effect of this influence will depend on the size, shape and the electrical properties of the body, and particularly on its nearness to the material being heated.

The effect of each these factors on the heating will depend on the type of heating used. There are three principal methods of RF heating in wood and lumber gluing. These, which are referred to as perpendicular, parallel, and stray field heating, are described in Baker "Principles of Dielectric Heating", pages 219–225, Proceedings of the Forest Products Research Society, Volume 2, March 1948, and Dimond "Glues for Use with High Frequency Heating", Proceedings of the Forest Products Research Society, Volume 2, March 1948 pp. 226–234.

Perpendicular heating means that the plane of the glue line is substantially perpendicular to the electrical field created by the electrodes of the generator. In perpendicular heating, the entire mass of the material to be joined is heated in the capacitive field, thereby heating both the adhesive and the wood to the required curing temperature. The substantial heat losses inherent in this method place severe limitations upon the volume and rate at which joints and laminates may be cured, upon the efficient use of power, and upon the thickness of the lamina being joined.

Parallel heating means that the glue line is substantially parallel to the field. In parallel gluing, sometimes called selective gluing, the object is to heat only the glue line. However, the uneven distribution of the electrical field as it passes through the glue lines limits the effectiveness of this type of heating to at most a few inches of width.

Both parallel and perpendicular heating involve high power losses.

Stray field heating places the electrodes adjacent to each other on the exposed surface of the same ply of a single glue line laminate. The current must pass through this ply before reaching the glue line. The intensity of the field is inversely proportional to the thickness of this layer and for practical purposes this method is limited to the gluing of thin sections.

Each of these three methods of RF heating have serious shortcomings for general usage in lumber laminating.

Attempts to overcome the deficiencies of RF heating have largely centered around the development of new adhesives, new electrode placements and designs, and higher capacity RF generators.

The new adhesive technology has involved the incorporation of water, conductive salts and other additives into the adhesive. These additives render the adhesives sensitive specifically to RF current, but have increased the tendency toward arcing. Arcing in the glue line is a constant problem if the glue is highly conductive. To overcome this problem, it is often necessary to sacrifice conductivity of the glue and the principle of selective gluing, and to substitute excessive power to provide a sufficiently high current flow to heat the entire mass of the laminate to the curing temperature of the glue.

Innovations in electrode design and placement have somewhat improved heating patterns while higher output generators have increased the mass which may be heated by perpendicular heating.

None of these innovations and improvements have overcome the basic limitations- the substantial heat losses in perpendicular and stray field heating, and the uneven distribution of the field in parallel heating.

3

These limitations have prevented RF gluing from having more than a narrow area of effectiveness in the lumber industry.

Blessing U.S. Pat. No. 2,372,929, issued Apr. 3, 1945, proposes the use of wire screen in the glue line as a resistance heating electrode to heat and cure the glue. However, wire screen does not work in an RF heating situation.

SUMMARY OF THE INVENTION

It has been found that the heating can be influenced by the deliberate introduction of field control elements into the medium to be heated and cured. These elements are patterned, have different conductive properties than the medium, and have no physical contact with the RF electrodes. They may be physical materials.

By this departure from conventional procedures faster cures and virtual elimination of arcing result. The invention is particularly useful for curing thermosetting adhesives, and results in an increase in the width of a joint area that can be glued with economically reasonable RF generators.

The present invention provides a method and an apparatus which will allow more efficient curing by the use of RF energy, more efficient curing of adhesives by RF energy in the manufacture of laminates, and also provide a product in which the curable component has a physical pattern of elements in the glue layer. The efficiency can be gained through the use of lower cost RF generators, increased production rates, reduction in plant floor space and machinery, and improved reliability.

BRIEF DESCRIPTION OF THE DRAWINGS

FIG. 4 is a top plan view, with portions cut away, of a laminated panel, illustrating a glue line cured in a parallel field under normal conditions and the small amount of curing that takes place under these conditions.

FIG. 5 is a top plan view, with portions cut away, of a laminated panel showing a striped pattern of field control elements in the glue line in accordance with the present invention.

FIG. 6 is a top plan view, with portions cut away, of a laminated panel showing a modified stripped pattern of field control elements in the glue line in accordance with the present invention.

FIG. 7 is a top plan view, with portions cut away, of a laminated panel, showing other patterns of field control elements which may be placed in the glue line in accordance with the present invention.

FIGS. 8–9 are magnifications of a section of one of the strips in FIGS. 5 and 6, respectively, showing the edge characteristics of the field control element when sprayed metal is used.

FIG. 10 illustrates the presence of a physical material; FIG. 11 illustrates the absence of a physical material.

FIG. 19 is an isometric view of an apparatus for the production of laminates by the present invention.

FIG. 20 is an isometric view of another apparatus for the production of laminates by the present invention.

FIGS. 26–28 are isometric views showing patterns of field control elements and auxilliary electrodes on the female member of notched joints.

FIGS. 29–30 are isometric views showing the matings of notched joints and other patterns of field control elements and electrodes.

FIG. 31 is an isometric view of particleboard being cured with a striped pattern of field control elements and modified stray field electrodes.

DESCRIPTION OF THE PREFERRED EMBODIMENTS

The present invention may be used for RF heating. It will be illustrated by its use in the curing of an adhesive to bond wooden members. These members may be wood veneers or pieces of lumber. However, the invention can be used in any process in which RF heating is used to cure a substance.

Figure 1:
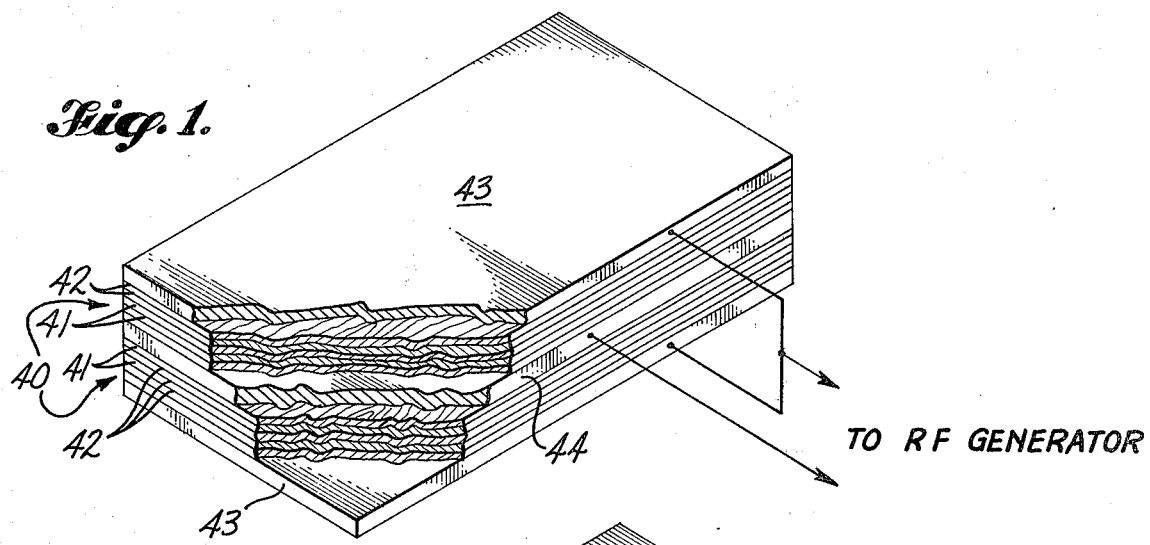
FIG. 1 is an isometric view, with portions cut away, of an apparatus illustrating perpendicular heating.
Figure 2:
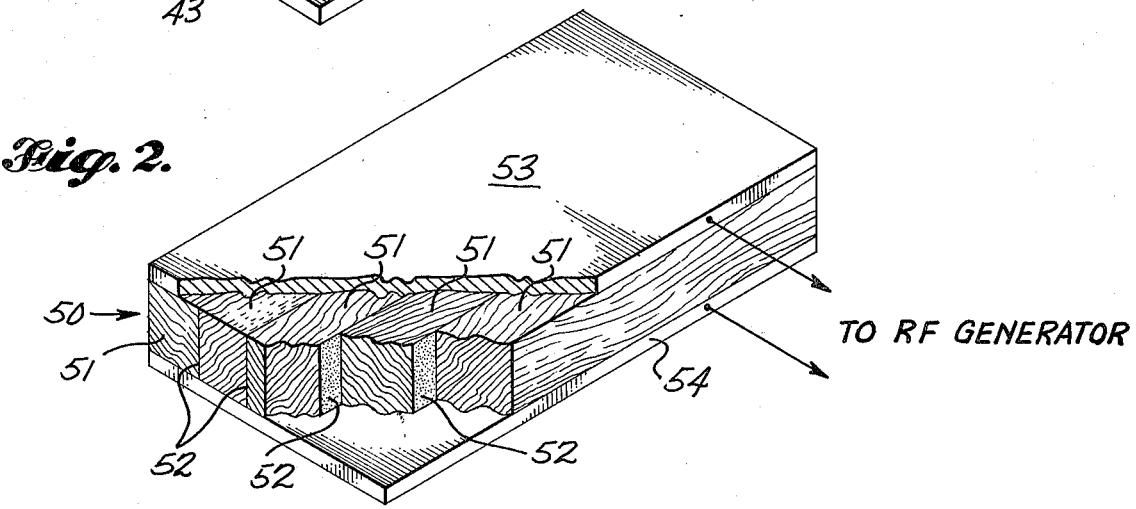
FIG. 2 is an isometric view, with portions cut away, of an apparatus illustrating parallel heating.
Figure 3:
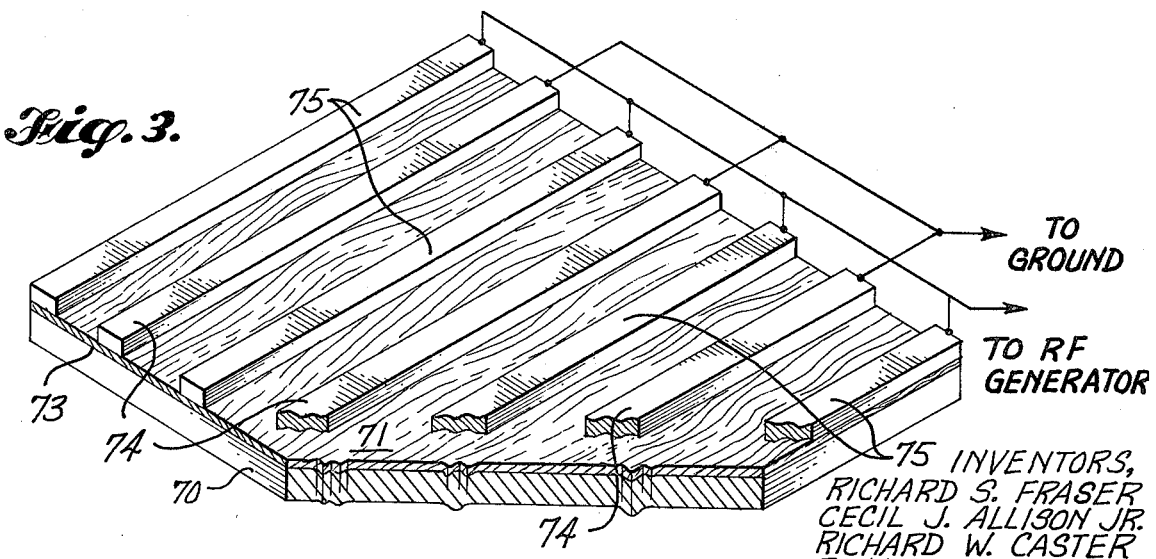
FIG. 3 is an isometric view, with portions cut away, of an apparatus illustrating stray field heating.

The three standard methods of curing glue by RF heating are shown in FIGS. 1–3.

In FIG. 1 wooden laminates 40 are to be formed from veneers 41 by bonding with the adhesive in glue lines 42. Each of the members 40 is sandwiched between electrodes 43 and 44. The RF field extends between the electrodes 43 and 44. The plane of the glue lines 42 and, therefore, the heating pattern is perpendicular to this field. In this perpendicular pattern the veneers 41 are interposed between the glue line and the electrodes so both veneers and glue line are heated by the RF field. This requires higher power.

In FIG. 2 a laminate 50 is to be formed from wooden members 51 by bonding with adhesive in glue lines 52. The member 50 is sandwiched between electrodes 53 and 54. Again, the field extends between the electrodes 53 and 54. The glue lines 52 and the heating pattern are parallel to this field. The field will tend to travel through the glue lines 52 and not through the wooden members 51 because the path through the glue line offers the least resistance. Because more RF energy is used for curing the glue and less is used for heating the wood, less power is required in the parallel heating pattern than is required in the perpendicular heating pattern.

However, there is another problem in parallel field heating. This is shown in FIG. 4. The member 60 formed by wood veneers 61 and 62 has been bonded along glue line 63 by the RF field generated by electrodes 64 and 65. A section of the upper veneer 61 has been cut away to show the resultant bond. The adhesive has cured along the side edges 66 but remains uncured in the center section 67. This is because the flux density, and the amount of heat generated, decreases as the distance from either of the electrodes increases, and is at its lowest at the midpoint between the electrodes 64 and 65. Consequently, there is a maximum width, dependent on glue and substrate, which can be cured by parallel heating. With wood using a standard RF glue, this width may be as great as 10 inches. Beyond this width heating is usually by means of perpendicular or stray field heating, because an increase in power in parallel heating will not result in an increase in the width of cured adhesive in the glue line. Above a certain threshold an increase in RF power will result in arcing in the glue line and buring of the substrate. This threshold will depend on the particular glue and particular substrate, so it is not possible, for example, to double the width of the glue line that can be cured simply by doubling the available power.

In FIG. 3 a laminate 70, to be formed from a veneer 71 bonded to a wood member 70 by a glue bond 73, is heated and cured by stray field RF heating. In this type of heating the electrodes 74 and 75 are placed adjacent the outer face of the veneer 71 and alternated. The RF stray field extending between the alternate electrodes 74 and 75 is arcuate and passes through the veneer 71 into the glue layer 73 to heat and cure the glue, and heat the veneer 71. The stray field energy may also extend into the wooden member 70 to heat this member. Consequently, a large amount of heat is dissipated in the heating of the veneer 71 and wood 70.

As can be seen, in both the perpendicular and stray field heating a large portion of the RF energy is used to heat the wood members and does not contribute to the actual curing of the adhesive. Both require additional power in order to heat the wood as well as cure the adhesive. Parallel heating requires less power because there is less tendency to heat the wood but there is a maximum width of glue line that can be cured.

In the present invention, field control elements are incorporated in the glue line, preferably in a pattern. This arrangement increases the efficiency of perpendicular and stray field RF heating by concentrating the field in the glue line and using less power to heat the substrate, and increase the utility of parallel heating by increasing the width of glue line that can be cured. By appropriate width and spacing, the patterned elements may either create a substantially uniform heating pattern, or deliberately concentrate the heating pattern in a particular location.

In using the invention, the members forming the lamina are assembled. During the assembly, the patterned field control elements are placed in the thermoreactive glue line between the members. The patterned elements should be substantially parallel to one another. For best effect, the elements should have clearly defined edges so that one element does not merge into another. Otherwise arcs may form. The members are held in positional relationship to each other in the assembly by temporary fasteners, clamps or gravity. The assembly is placed between the electrodes of an RF generator, heated and cured. Parallel heating is preferred. The field control elements are positioned between the electrodes substantially coplanar with and perpendicular to the electrical field. The field direction is perpendicular to the electrode. There is no electrical connection between the elements and the electrodes. If parallel heating is used the extremities of the glue line containing the outermost elements must be closely adjacent to the electrodes.

The pattern of field control elements may consist of stripes or of discrete shapes such as circles or ellipsoids placed in a particular arrangement.

FIG. 5 shows an assembly 80 formed by veneers 81 and 82 which are to be bonded together by adhesive 83. Field control elements 84 have been placed in the glue line. The elements 84 are in a striped pattern of equal width and equal spacing. The electrodes 85 and 86 are positioned for parallel heating.

FIG. 6 shows an assembly 80a formed by veneers 81a and 82a which are to be bonded together by glue 83a. Field control elements 84a have been placed in the glue line. In this assembly the pattern of the field control elements is again striped but the outer strips are spaced further apart than the inner strips in order to concentrate the heating pattern toward the center of the assembly. Again, electrodes 85a and 86a are positioned for parallel heating.

In FIG. 7 an assembly 80b is to be formed from veneers 81b and 82b which are to be adhered by glue 83b. Patterned field control elements in the form of ellipsoids 84b and circles 84c have been placed in the glue line. Electrodes 85b and 86b are positioned for parallel heating.

The width of the elements and the spacing between elements will affect the heating pattern because the heat is generated in the space between elements and not over the element. If the width of the elements is substantially less than the spaces between them, the heating effect is reduced and less heat is generated between the elements. If the elements are wider than the spaces, the heating area is reduced but the heat in the area is intensified. Normally optimum results are obtained when the width of an element equals the spacing between elements.

For an element in the form of a strip, the minimum effective width is 1/16 inch, and the maximum effective width is ⅜ inch.

The width and spacing of elements may be changed across the substrate. In parallel heating, the density of the field is lowest and heating least at the midpoint. If the space between electrodes is great enough, no heating will take place in the center. This is shown in FIG. 4. The use of field control elements equally spaced across the glue line as in FIG. 5 will increase the density and heat at the midpoint but there will still be a decrease in heat toward the midpoint. It is possible to increase the density and heat at the midpoint. This is done either by increasing the number of elements at the midpoint or by increasing the width of the elements at the midpoint. Either method tends to make the field as a whole more uniform.

The field control elements may be used with many wood laminating adhesives. The adhesives may or may not have been formulated especially for ratio frequency gluing. These adhesives include phenol-formaldehyde, resorcinol-formaldehyde, urea-formaldehyde, melamine-formaldehyde, and various combinations of these with and without conductive additives. The conductive additive may be amorphous carbon. Acetylene black is the preferred amorphous carbon so this will be used throughout the specification.

The adhesive may have a caustic content that is higher than that usually used in RF gluing because the field control elements raise the arcing threshold of the adhesive by reducing the RF power requirements. This permits the use of a wider variety of adhesives than is presently possible.

The type of adhesive will be determined by the overall process. The initial RF cure of the adhesive is limited to the spaces between the field control elements. The adhesive in contact with the element is cured either by heat at elevated temperatures or by catalysis at room temperature. The adhesive will be cured by heating if the material forming the field control element is highly heat conductive. The element will then conduct heat from the space between elements to the space over the element if the applied RF current is great enough or remains on long enough to create the heat required to cure the adhesive over the element. If these conditions are met then a heat-curing adhesive may be used. If these conditions are not met then an adhesive catalyzed to cure at room temperature should be used. In this latter case the initial cure in the area between the elements must be sufficient to hold the members in proper relationship until the adhesive over the strips has completely cured by chemical reaction at ambient temperatures.

The field control elements may be composed of any material having a conductivity different from that of the glue. Metal foils, woven metal filaments, metallic inks or paints, adhered metal powder or carbon blacks, flame sprayed metal deposits or even an adhesive of different conductivity are effective. Various poor conductors, and conductors of high resistance such as particulated carbon may be used. Even a pattern area void of adhesive may be used.

Figure 10:
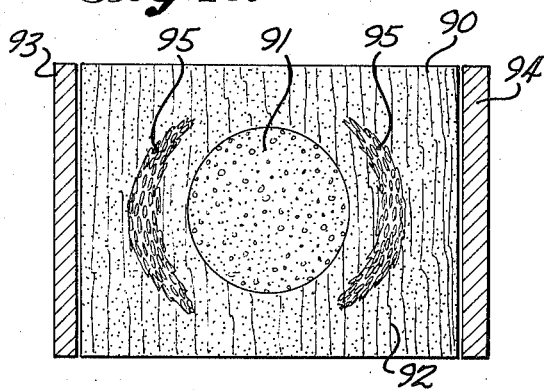
FIGS. 10–11 show the field orientation if the field control element is an individual circular spot.
Figure 11:
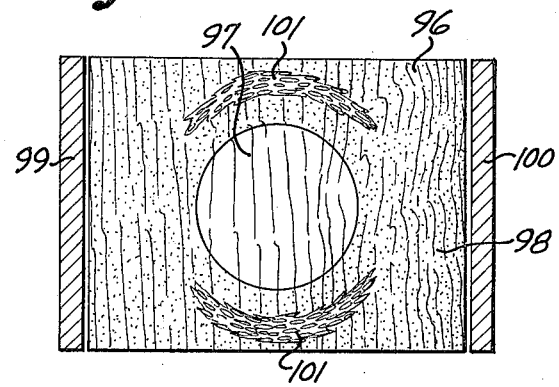
Figure 12:
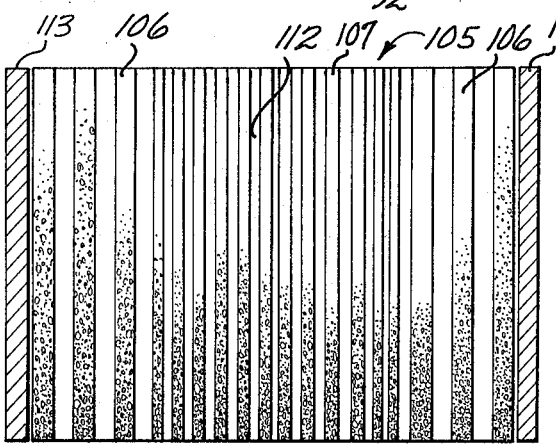
FIGS. 12–14 are top plan views of various patterns of field control elements.
Figure 13:
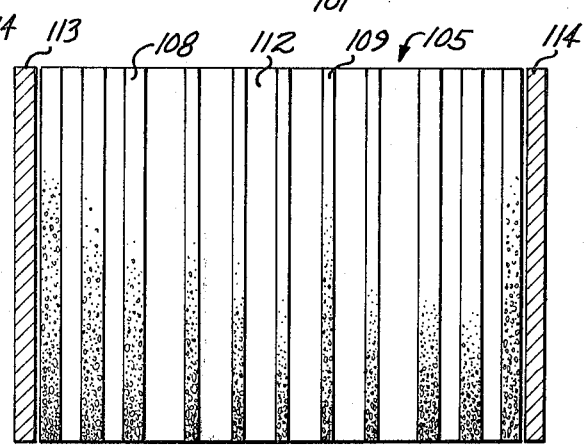
Figure 14:
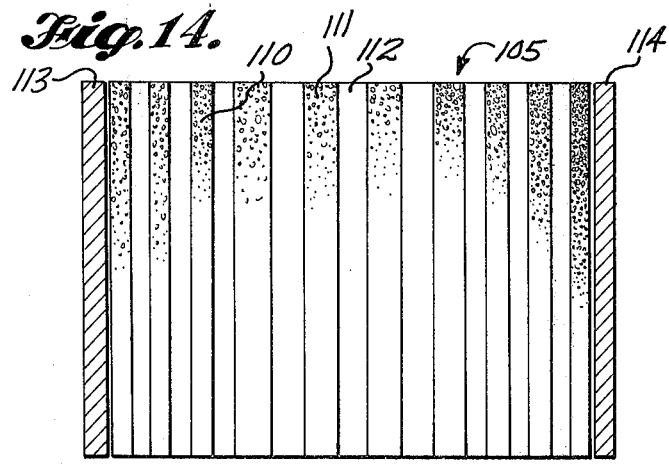

The heating pattern of conductive and nonconductive materials differs. This is shown in FIGS. 10–11 in which circular spots, one of conducting material and the other a void, are placed in a layer of glue. In FIG. 10 the substrate 90 has a circular spot 91 of conducting material in the glue line 92. The electrodes 93 and 94 cure the glue by parallel heating. The curing pattern is shown at 95. In FIG. 11 a substrate 96 has a circular void 97 in the glue line 98. The electrodes 99 and 100 again cure the glue by parallel heating. The curing pattern is shown at 101. As may be seen, the curing pattern for the bare or nonconductive spot is rotated 90° from the curing pattern for the conductive spot.

In general, elements formed by metal foils or woven metal filaments are not as effective as metallic paints, flame sprayed metal deposits or poor conductor particles. The former tend to concentrate the field more at the very edge of the element instead of distributing it evenly across the space between elements. The latter materials tend to distribute the field evenly.

Normally the field control elements should not extend for any distance beyond the electrodes. This could occur if an elongate assembly having field control elements in the form of conductive stripes was being passed between the electrodes. The stripes would apparently act as transmission lines and cause a field to be created along the entire length of the assembly, decreasing the field intensity and heating between the electrodes.

This difficulty can be overcome by making the elements discontinuous. The element should have areas void of conductive material at various intervals. These void areas are shown at 87 in FIG. 5 and 87a in FIG. 6. The length and spacing of the voids will depend on such factors as the magnitude of the applied current, the electrode and its configuration, and the type of bonding application. Voids varying between ¼inch and 1 inch in length and spaced at intervals of 12 to 14 inches have been used with electrodes both 12 inches and 24 inches long, at both 13 and 27 megacycles and at a considerable variation in current.

Voids are also preferred with less highly conductive materials, such as metallic inks, adhered particles or sprayed metals, but this is not absolutely essential, because there is less tendency for these materials to elongate the field outside the area of the electrodes.

This discontinuity is one reason why discrete particles deposited in a pattern directly on a substrate are best. The particles also provide a porous and discontinuous deposite which does not interfere with bonding because the glue can provide a wood to wood bond around the particles. Typical conductive or semiconductive particles are an amorphous carbon, lead sulfide, granular aluminum powder, or combinations of these materials. The preferred amorphous carbon for all purposes is acetylene black so the term acetylene black will be used throughout the specification.

The particles may be placed on the substrate in a number of ways. For example, they may be dispersed in a bonding agent such as an ink or lacquer. Particles of aluminum, cooper, zinc, various alloys such as bronze or brass, or alloys of iron and steel or other metals may be applied in this way.

The particles may also be adhered to the substrate. This requires a binder to agglomerate individual particles into larger particles, and an adhesive to bind the larger particles to the substrate. The three — the particle, the binder and the adhesive — should be compatible. For example, aluminum particles would not be used with binders or adhesives having a high caustic content because of the chemical reaction which takes place.

Compatibility is not the sole requirement of the binder. In order to prevent smearing of a stripe, the binder must be capable of drying quickly but there should be little or no polymerization during the time required to spread, assemble and press the joints. It should also be capable of curing jointly with the adhesive to develop a substantially homogenous adhesive in the stripe area. For good uniform bonding, it is preferred that the binder be chosen from among the components of the basic adhesive or from the group of analogous compounds.

Typical binders are low caustic phenol-resorcinol resins, high caustic phenol-resorcinol resins, formaldehyde in methanol solution, uncatalyzed urea resin, urea resin catalyzed with ammonium chloride and sodium chloride, melamine-urea resin, phenol-formaldehyde resin, and acid catalyzed urea acetaldehyde.

The preferred binder for use with phenol-formaldehyde resin adhesive is a low caustic phenol-formaldehyde resin, and the preferred conductive particle is either granular aluminum powder or a mixture of acetylene black and granular aluminum powder.

Both low caustic and high caustic phenol-resorcinol resin may be used as binders with a mixture of acetylene black and lead sulfide.

When using urea-formaldehyde resin adhesives, the preferred binder is urea resin catalyzed with ammonium chloride or sodium chloride, and the preferred conductive particle is granular aluminum powder. Other binders which may be used with urea-formaldehyde resin adhesives are formaldehyde is methanol solution, uncatalyzed urea resin, and malamine-urea resin. Another conductive particle which may be used is a mixture of acetylene black and granular aluminum powder.

The preferred binder for use with melamine-urea formaldehyde bonding resins is an acid catalyzed urea acetaldehyde and the preferred conductive particle is granular aluminum powder. Other binders which may be used are urea resin catalyzed with ammonium chloride or sodium chloride, and melamine-urea resin. Another conductive particle which may be used is a mixture of acetylene black and granular aluminum powder.

The elements may also be applied by means of the flame spray process using wire or powdered metals. The wire spray process is preferred because it is cooler and many substrate materials will not withstand the temperatueres required for the powder flame spray process. The metals used in the process are aluminum, zinc, tin and lead. Aluminum is preferred for its economy in handling and low toxicity.

Sprayed metal patterns are not continuous. FIGS. 8 and 9 are highly magnified views of the edge of a stripe formed by sprayed metal. As may be seen, the edges are formed by discrete particles 84f in the flue line 83f.

A flame spray deposit will operate successfully as an element when it is so thin and discontinuous to register infinite resistance on a vacuum tube ohmmeter. Such deposits have been as thin as 0.0001 inch (0.1 mil), as measured by weight. By applying a moderately conductive glue which bridges over the spaces between the metal particles in the pattern, the area of the pattern becomes a band of specific conductivity greater than the conductivity of either the glue or the metal pattern alone. Such conductivity is adequate for control of the field.

The elements may also be formed of sodium hydroxide. The sodium hydroxide may be placed on a high wet-strength sheet and dried or it may be placed directly on the substrate. It is presumed that the sodium hydroxide being hygroscopic readily takes moisture from the waterborne adhesive as the two components of the joint are brought in contact and thereby becomes adequately conductive to serve as a means of control of the RF field. The amount of sodium hydroxide used can be altered over a wide range to accommodate conductive needs for manufacturing procedures and safety requirements.

When applied directly to the substrate it is usual to mix the sodium hydroxide with a particular thickner. The thickener is not essential to the field controlling properties of elements formed from sodium hydroxide but does give body to the aqueous sodium hydroxide solution and limits its migration outside the patterned area on the substrate. Acetylene black is preferred because it also enhances the electrical properties of the sodium hydroxide. Other thickeners tend to reduce the conductivity of the element. The proportions of acetylene black can vary between about 2% to 10% of the total weight of the solution and preferably is about 5%.

Sodium hydroxide creates a system that is simpler and cheaper than metal spray and metallic ink systems because a uniform homogenous film is transferred by printing. This cannot be done with large metallic particles. The system has advantages because heat is developed in the area of the elements. If sprayed metal or metallic inks are used, little heat is developed in the area of the element during a short RF cycle so there is very little curing of the adhesive in the element area until after the RF treatment. This curing is at ambient temperatures, requiring special glues.

There appears to be two reasons for this improvement with sodium hydroxide. The first is the presence of a relatively high concentration of caustic. The second is the absence of aluminum or other metallic particles which may act as a heat absorber to prevent immediate curing.

This printing technique may also be used with a high caustic content, waterborene phenolic resin as the element. A high caustic resin would be a phenol-formaldehyde resin having a total caustic content of approximately 6%. It may also be mixed with acetylene black. Between 2% and 10% of acetylene black may be used. This type of resin would have a DC resistance of from 30,000 ohms per square to 100,000 ohms per square when wet. It deteriorates rapidly to several megohms but regains its substantial conductivity when a waterborne resin touches it.

It is possible to coat a substrate with stripes of two dissimilar resins. For example, one may be a high caustic content phenolic resin combined with resorcinol and the other a low caustic content resin. In this way one of the adhesives would act as the element.

EXAMPLES

In the following examples the glue cure is measured by a visual fracture test. In this test, a knife is inserted into the glue line and the laminae are pried apart. If the glue bond does not fail and the entire glue line is covered with wood at the fracture the bond is designated 100% wood failure. If for example, one-half of the glue bond fails and one-half of the fracture area is covered with wood fiber, the bond is designated 50% wood failure. The higher the percentage of wood failure, the better the glue bond and the better the cure.

EXAMPLE 1

A number of pairs of wood pieces 2¾ inches wide, 11 inches long and 1 inch deep were to be laminated. The adhesive, a phenol-resorcinol-formaldehyde resin containing paraformaldehyde, was placed on one of the mating faces of each pair, and a continuous zinc or aluminum film was placed on the other mating face of the pair. Varying thicknesses of zinc and aluminum were used. The members were placed in an RF field. The glue line was parallel to the field. The adhesive did not cure.

EXAMPLE 2

A ⅝ inch deep by 6¼ inch wide by 8 inches long piece of Douglas fir was coated with adhesive at a spread weight of 8 grams per sq. ft. The adhesive is described in Example IV of Kreibich et al. U.S. Pat. No. 3,422,068 which issued Jan. 14, 1969. A standard mesh wire screen was placed in the glue line with its edges one-quarter inch inside of the edges of the lumber and another section of lumber placed on the first section. The two sections were placed with pressure in an RF field. The field was parallel to the glue line.

At outputs of both 200 milliamperes and 275 milliamperes excessive arcing developed which forced shutdown of the generator. No curing of the glue line was observed at 275 milliamperes and no appreciable amount of curing was observed at 200 milliamperes.

EXAMPLE 3

The samples, adhesive, field strength, field orientation and metal film were the same as in Example 1. The only difference was that the continuous metal film was divided and the two halves were spaced ¼ inch apart to form a strip void of metal, the void strip running perpendicular to the RF field. The adhesive in the area of the void strip boiled.

EXAMPLE 4

The samples, adhesives, field strength and field orientation or type or heating were the same as in Example 1. The surface to be metallized was masked and a pattern of 5/16 inch wide strips of flame sprayed aluminum spaced 5/16 inch apart were placed on it. The stripes were perpendicular to the RF field as shown in FIG. 5. A control sample without elements was also placed in the field. Both samples remained in the field for 10 seconds. In the striped sample, the glue in the area between the metal strips cured across the entire width of the joint. In the control sample the glue cured along the edges adjacent the electrodes only as shown in FIG. 4.

EXAMPLE 5

A pattern similar to that shown in FIG. 6 was placed on a 10 inches by 12 inches piece of Douglas fir veneer by masking the substrate and flame spraying it with aluminum. The striped elements ran parallel to the 10 inches dimension.

The patterned face was coated with a phenol-aldehyde glue and placed in the RF field of a 5 kw generator. The electrodes were 12 inches apart. The stripes were perpendicular to the field and the glue line was parallel to the field. A control sample without elements was also placed in the field with the glue line parallel to the field. The samples remained in the field for 10 seconds. The glue line in the striped sample was completely cured in the area between the metal stripes. The glue line in the control sample cured only along the edges adjacent the electrodes.

EXAMPLE 6

The samples, adhesive, field strength and orientation, and element material, pattern, width and spacing were the same as in Example 5, except that the veneer samples were 10 inches by 24 inches and the electrodes were 24 inches apart. The stripes ran parallel to the 10 inches dimension. Approximately 0.4 grams per square foot of aluminum were deposited on approximately 50% of the surface area. Estimated thickness of the stripes was 0.13 mils indicated a density about 60% of maximum.

The glue line of the sample with elements was completely cured in the area between the metal strips. The glue line of the control sample without elements was cured only along the extreme edges adjacent the electrodes.

EXAMPLE 7

The samples, adhesive, field strength and orientation, and element material, pattern, width, spacing and method of application were the same as in Example 6. The aluminum deposit was 0.2 grams per square foot of total stripe area and the thickness was estimated to be 0.03 mils. Again the glue line of the patterned substrate cured in the area between the stripes while the glue line of the control only cured along the edges adjacent the electrodes.

EXAMPLE 8

The samples, adhesive, field strength and orientation, and element material, pattern, width and spacing were the same as in Example 5, but the striped pattern was placed on a sheet of 12 lb. per 3000 sq. ft. high wet-strength absorbent paper. The paper was impregnated with the resin adhesive and placed between the veneer strips. The glue cured in the area between the stripes when the elements were used. It cured only along the edges adjacent the electrodes when no elements were used.

EXAMPLE 9

A 12 inches long by 5½ inches wide by ⅝ inch deep Douglas fir board was masked and sprayed with aluminum. The resulting pattern consisted of alternate stripes and spaced each approximately ¼ inch by 12 inches running perpendicular to the 5½ inches dimension. The unit weight of aluminum in the stripes was about 0.6 grams per square foot. A 1/16 inch diameter hole was drilled through the thickness of the board at the geometric center of the board. The hole was midway between the two centermost stripes.

The striped surface of the board was spread with a phenol-resorcinol-formaldehyde laminating adhesive and an iron-Constantan thermocouple inserted through the hole. The thermocouple junction was in the glue line. A second board of the same size, without stripes, was placed on the adhesive-covered surface of the first and the assembly clamped in a press at 175 psi. Electrodes of a 2.7 kw RF generator were placed along each 12 inches edge of the assembly and the thermocouple was connected to a recording potentiometer. The RF current was filtered out of the thermocouple circuit to insure an accurate reading. The stripes were perpendicular to the field and the glue line was parallel to the field.

The generator was activated and adjusted to 300 milliampere current flow on each of the two output tubes. The radio frequency field was maintained for 10.7 to 10.8 seconds and the glue line temperature was continuously recorded.

Four identical runs were made, two samples with elements and two control samples without elements. The results are shown in Table I.

TABLE I

|  |  | Time in R.F. (Sec.) | Glue Line Starting Temp (°C) | Glue Line End Temp (°C) | Glue Line Temp Rise (°C) |
| --- | --- | --- | --- | --- | --- |
| Metal Stripes | (Run 1) | 10.8 | 18 | 87 | 69 |
| Control | (Run 1) | 10.8 | 18 | 27 | 9 |

TABLE I – Continued

|  |  | Time in R.F. (Sec.) | Glue Line Starting Temp (°C) | Glue Line End Temp (°C) | Glue Line Temp Rise (°C) |
|---|---|---|---|---|---|
| Metal Stripes | (Run 2) | 10.7 | 18 | 93 | 75 |
| Control | (Run 2) | 10.7 | 18 | 22 | 4 |

EXAMPLE 10

One of the samples with elements from Example 9 was exposed for 40 seconds to a radio frequency field with 450 milliampere tube current and showed 85–100% wood failure when tested within three minutes after removing from the press.

EXAMPLE 11

The following Douglas fir veneers were chosen for an 11/16 inch plywood laminate: an outer ply, 1/8 inch thick; a crossband ply, 1/8 inch thick; a center ply, 3/16 inch thick; a crossband ply, 1/8 inch thick; and an outer ply, 1/8 inch thick.

The veneers were cut to 5½ inches by 12 inches. The four glue lines of one set were sprayed with aluminum conductors and spread with a phenol-resorcinol-formaldehyde resin. The laminate was assembled and placed between the electrodes of a 27 mc RF generator and pressed at a pressure of 200 psig. The stripes were perpendicular to the field and the glue lines were parallel to the field.

The laminate remained for 40 seconds in an RF field at a tube current of 400 ma. The sample was removed from the press and broken after three minutes with a plywood knife. There was 10% wood failure in the outer plies and 45% wood failure in the inner plies. The sample was well bonded throughout the width of the glue lines.

A control sample with no elements was pressed and cured in the same manner and also broken after three minutes. It revealed 5% wood failure on the outer edges of the outer plies, 20% wood failure on the outer edges of the inner plies, and complete delamination of the center section of both outer and inner plies.

A second control sample with no elements was placed in a conventional press having steam platens heated to 320° F. The press was closed for 40 seconds at 200 psig. and the sample removed. There was complete and immediate delamination of all glue lines upon release of pressure.

EXAMPLE 12

This example demonstrates some of the effects of the width and spacing of elements. FIGS. 12–15 illustrate this example.

Samples 105 Douglas fir lumber measuring 5/8 inch deep by 3 inches wide by 11 inches long were used. Several were metal sprayed with pattern A shown in FIG. 12. In this pattern the outer elements 106 were stripes 1/8 inch wide and spaced 1/8 inch apart, and the central elements 107 were stripes 1/16 inch wide and 1/16 inch apart. Several more were metal sprayed with pattern B shown in FIG. 13. In this pattern the outer elements 108 were again stripes 1/8 inch wide and 1/8 inch apart, and the central elements 109 were stripes 1/16 inch wide and 3/16 inch apart. Another group was metal sprayed with pattern C shown in FIG. 14. Again the outer elements 110 were stripes 1/8 inch wide and 1/8 inch apart, but the central elements 111 were stripes 1/4 inch wide and 1/4 inch apart. Control samples had no elements.

A 50-lb. per thousand square foot spread of phenolresorcinol-formaldehyde adhesive 112 containing 5% wood flour and 6% paraform was placed on each of the striped samples and on several control samples. Each of the samples was laminated to an untreated sample at 150 psig. in the field of a 2.7 kw generator at 450 ma. tube current. The stripes extended perpendicular to the field and the glue line parallel to the field of electrodes 113 and 114. The samples were exposed to the field for varying periods of time.

A thermocouple was used to measure temperatures of the glue lines at the midpoint between the electrodes. At 45 seconds, the glue lines of control samples were barely above the ambient temperature, but the glue lines between stripes in the patterned samples were evenly cured. The glue line of pattern B was warm in the center at 10 seconds and the glue lines of patterns A and C were hot in the center at 20 seconds.

Figure 15:
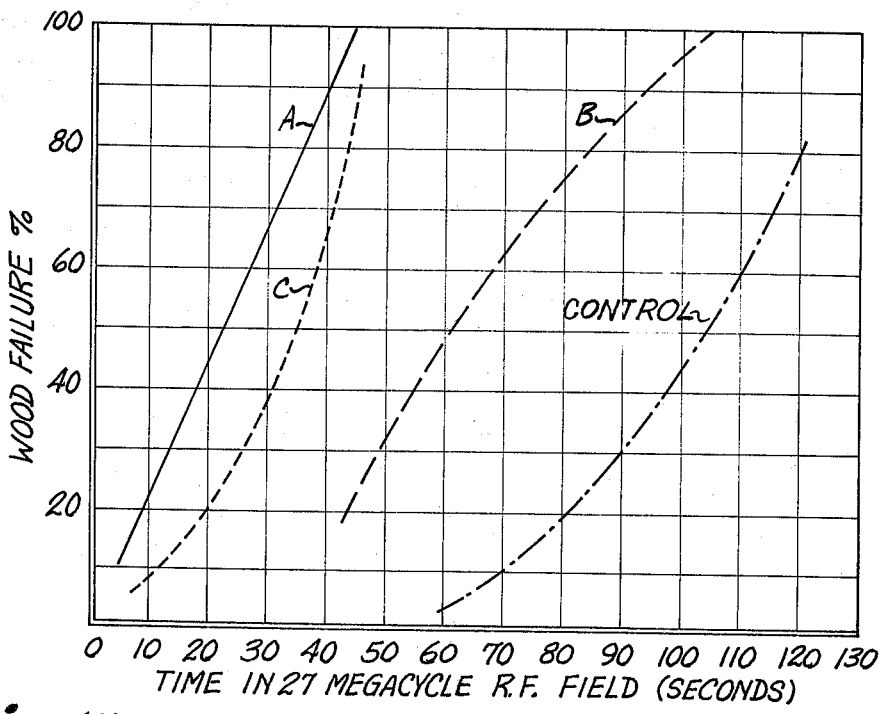
FIGS. 15–17 are graphs showing the influence of a different pattern of field control elements on adhesive cure.

Joint strength for various periods of exposure in the field is illustrated in FIG. 15. The percentage of wood failure is plotted as a function of the length of time of the sample in the field. It can be seen that the field dwell time for a sample with elements is much less than for a control sample without elements for the same joint strength. For example, at 80% wood failure, pattern A had a field dwell time less than one-third that of the control, and consumed less power than the control.

EXAMPLE 13

The following adhesive formulation was prepared: 3 parts waterborne phenol-formaldehyde resin to 1 parts phenol-resorcinol resin. The phenol-formaldehyde resin had a 38% solids content, contained approximately 3% caustic and was a formaldehyde donor. The phenol-resorcinol resin had a 52% solids content, and contained 28.8% resorcinol.

A 1 inch deep by 5.6 inches wide piece of Douglas fir lumber was planed and cut into 4 inches lengths. For each glue line, one piece was coated with adhesive. The spread was about 20 lbs. of resin per thousand square feet. Another piece was placed over the glue and the assembly was placed between the electrodes with the glue line parallel to the field. The electrodes were on either side of the 5.6 inches dimension. The pieces were under 200 psig. pressure. The current was about 500 milliamperes. Samples were left in the field for various time periods, and each sample was tested for wood failure immediately upon removal from the press. The results are shown in control curves in FIGS. 16–17. In both graphs, wood failure is plotted as a function of dwell time in the field.

EXAMPLE 14

The samples, adhesive, adhesive spread and placement, field strength and orientation, pressure and testing procedure were the same as in Example 13. A pattern of striped elements 1/4 inch wide and spaced 1/4 inch apart was placed on one of the members within the glue line. The elements were composed of phenol-formaldehyde resins, paraform, and acetylene black particles. The elements were perpendicular to the field.

Figure 16:
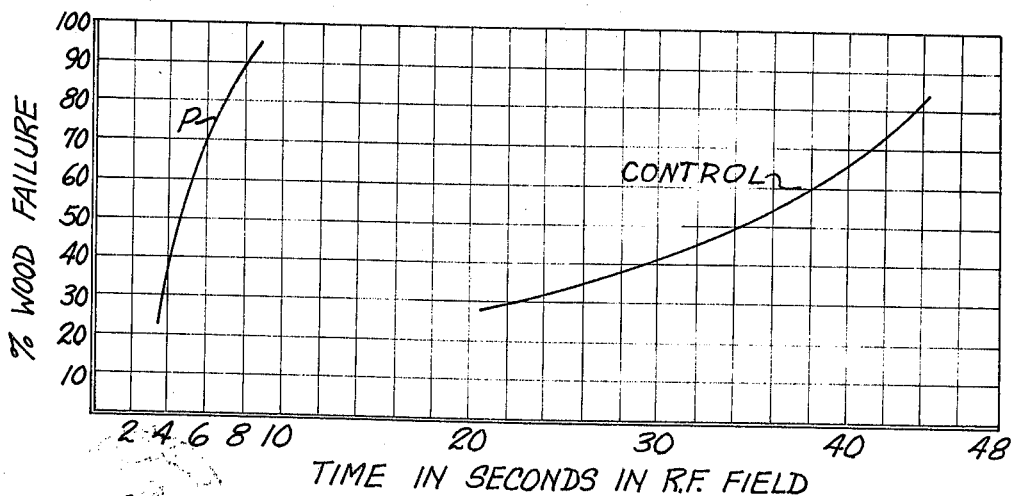

FIG. 16 compares the joint strengths of the Samples P of this example and the control sample of Example 13. Wood failure is plotted as a function of sample dwell time in the RF field. The Samples P reached 90% wood failure in 8 seconds. This represents a six-fold increase in efficiency.

EXAMPLE 15

Figure 17:
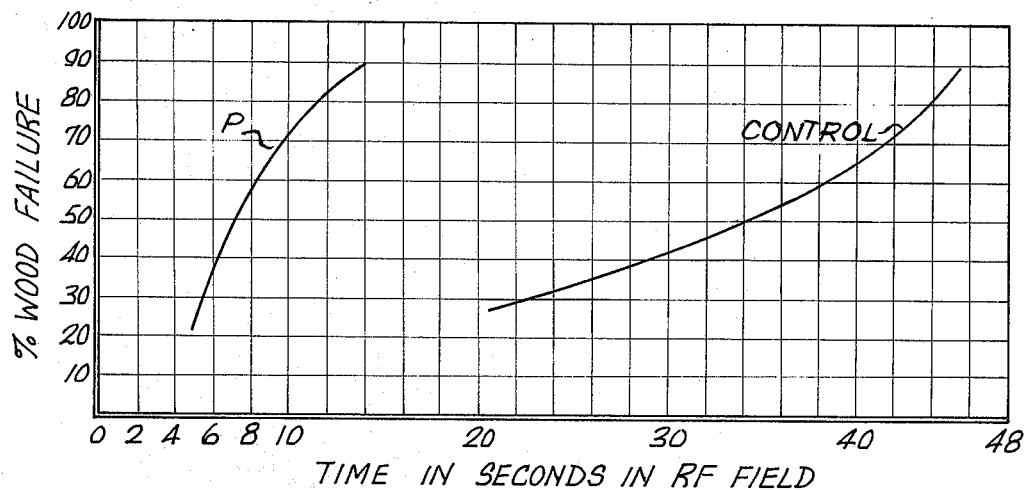

The samples, adhesive, adhesive spread and placement, field strength and orientation, pressure, element pattern, width and spacing, and testing procedures were the same as in Example 14 but the striped elements were formed of a mixture of NaOH solution and acetylene black. FIG. 17 is a graph showing the influence of the elements on the adhesive cure and comparing the striped Samples P with the control Samples of Example 13. The percentage of wood failure is plotted as a function of the dwell time of the sample in the field. Again there is increased efficiency by use of the elements.

EXAMPLE 16

One of the samples from Example 13 was removed from the RF field of Example 13 after 15 seconds. There was only faint spot heating in the glue line.

EXAMPLE 17

The samples, adhesive, adhesive spread and placement, field strength and orientation, pressure, element pattern, width and spacing, and testing procedures were the same as in Example 14. The striped elements were formed by impregnating a sheet of high wet strength paper with a 40% NaOH solution and drying it at 70° C for 20 minutes. The dried sheet was then cut into strips which were placed on the sample. The sample remained in the RF field for 15 seconds. The joint revealed substantial and uniform wood failure between the stripes as compared with the faint spot heating in the control of Example 16.

EXAMPLE 18

The samples, adhesive, adhesive spread, field strength and orientation, pressure, element pattern, width and spacing, and testing procedure were the same as in Example 14. The striped elements were formed of a mixture of one liter of 25% solution of sodium hydroxide and 100 grams of acetylene black with methanol as a thinner. The elements were sprayed on the sample through a striping mask, and dried in air. The adhesive was spread on opposing members. Samples were removed from the field after 5, 7, 12 and 15 seconds and produced approximately 20, 70, 80 and 92% wood failure respectively.

A control sample with no elements required 45 seconds to achieve 95% wood failure.

Another sample having elements formed of flame-sprayed aluminum had wood failures equivalent to those using the sodium hydroxide-acetylene black mixture.

EXAMPLE 19

The samples, adhesive, adhesive spread and placement, field strength and orientation, pressure, element material, pattern, width, spacing and method of application were the same as in Example 18. The sample was removed from the field after 7 seconds and allowed to set for 30 seconds. There was substantial wood failure over the elements as well as between the elements.

EXAMPLE 20

A grooved roll coater was used to print resin elements in a pattern of parallel stripes ¼ inch wide and ¼ inch apart on lumber samples which were the same as in Example 13. The resin was dried. The resin was a high caustic content waterborne phenolic resin mixed with 5% acetylene black and fed into the roll coater. The high caustic resin was a phenol-formaldehyde resin, a formaldehyde donor, with a total caustic content of approximately 6% and an unknown amount of free caustic.

The striped lumber was mated with a board spread with a waterborne phenol-resorcinol resin, placed in the RF field under 200 psig. pressure and allowed to cure at room temperature after removal from the RF field. Samples which had been in the RF field 7 to 9 seconds achieved 90% wood failure, comparable to the best curing rates of both metal sprayed stripes and caustic stripes.

EXAMPLE 21

The samples, adhesive, adhesive spread and placement, field strength and orientation, pressure, element material, pattern, width, spacing and method of application were the same as in Example 20. The sample was removed from the RF field after 7 seconds and broken open within 30 seconds after removal. There was wood failure in the stripe area, as well as the intervals between, indicating the possibility of 100% wood failure at ultimate cure.

EXAMPLE 22

This example demonstrates both that a semi-conductor may be used as a field control medium and that the semi-conductor may be a natural and unrefined mineral.

The samples, adhesive, adhesive spread and placement, field strength and orientation, pressure, element pattern, width and spacing, and testing procedures were the same as in Example 13.

The elements were made with a mixture of 5% by weight of acetylene black, 5–10% by weight of the phenol-formaldehyde resin of Example 13, and equal parts by weight of thickened methyl Formcel and powdered lead sulfide and diluted to a sprayable consistency with methanol. Methyl Formcel is a solution of approximately 50% formaldehyde in methanol. It was thickened with a hydroxymethyl cellulose to a Gardner-Holt viscosity of about U.

The samples were sprayed with the mixture through a mask. The joints demonstrated good field control by deep wood failure between the stripes immediately after removal from the field and good ultimate bonds.

EXAMPLE 23

1 inch by 6¼ inches by 8 inches samples of Douglas fir lumber were used throughout this experiment.

Control samples were spread with a melamine-urea resin at a spread level of approximately 25 lbs. per thousand square feet on a single glue line and bonded under 200 psig. in an RF field at 450 ma. current. The glue line was parallel to the field. The time in the RF field was varied.

A urea-acetaldehyde binder having the following formulation was prepared:

| | |
|---|---|
| Acetaldehyde | 38.5 weight % |
| Urea | 26.3 weight % |
| H₂O | 26.3 weight % |
| HClO₄ | 8.8 weight % |

Five percent acetylene black was added to this mixture and the whole reduced to a sprayable viscosity with methanol.

Boards, sprayed with the binder in a pattern of parallel stripes, ¼ inch wide and ¼ inch apart, were mated with boards spread with the melamine-urea resin and bonded. The spread level, pressure, current and times were the same as these used with the control samples.

A urea-formaldehyde binder having the following formula was prepared:

| | | |
|---|---|---|
| Formaldehyde | 13 | weight % |
| Urea | 39 | weight % |
| H₂O | 18.5 | weight % |
| Paraform | 24.9 | weight % |
| Methanol | 4 | weight % |

The boards were spread and bonded in the same manner as the urea-acetaldehyde sample.

Table II shows the results in percent wood failure immediately after removal from the press.

TABLE II

| Time in Press Sec. | % Wood Failure | | |
|---|---|---|---|
| | Control | Urea Formaldehyde | Urea Acetaldehyde |
| 20 | 0 | | 50 |
| 30 | 0 | 10 | 50 |
| 45 | 0 | 35 | 80 |
| 60 | 0 | 60 | |
| 120 | 35 | | |
| 240 | 40 | | |

EXAMPLE 24

Two sets of samples were prepared from wood members 3 inches wide by 11 inches long by 1 inch deep. One member of each pair was striped with elements having the pattern shown in FIG. 14. The three outer stripes in the pattern are ⅛ inch wide on a ⅛ inch spacing. The four inner stripes are ¼ inch wide on a ¼ inch spacing. The elements were formed by flame sprayed aluminum. Approximately 0.4 grams per square feet of aluminum were deposited on approximately 50% of the surface area. Estimated thickness of the stripes was 0.13 mils indicating a density about 60% of maximum. The electrodes of the 5 kw RF generator were 24 inches apart.

The difference between the two sets was the adhesive used. One set of samples used a phenol-resorcinol-formaldehyde resin having a 5% wood flour filler. The other set of samples used the same phenol-resorcinol-formaldehyde resin with a 6% acetylene black filler substituted for the wood flour. The samples remained in the RF field for varying periods of time. The glue bond was tested immediately after removal from the field.

Figure 18:
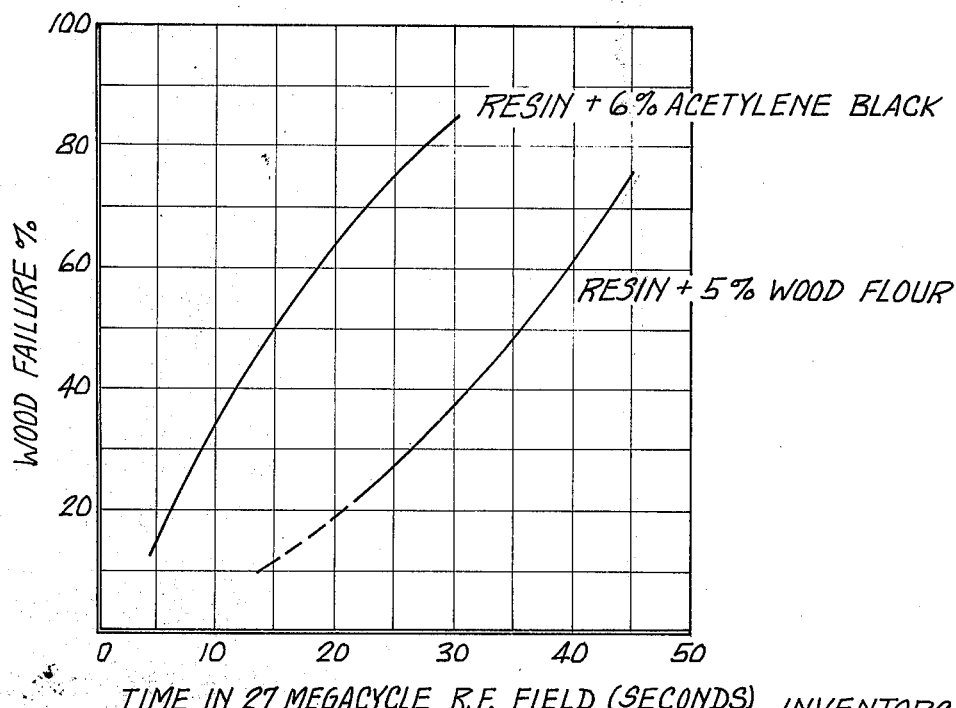
FIG. 18 is a graph showing the influence of glue additives on the adhesive cure.

The results are shown in FIG. 18. As can be seen, much better bonding was achieved by the use of acetylene black. It was possible to achieve either better bonding in the same length of cure time or the same degree of bonding in a much shorter cure time.

A third sample set was prepared in the same manner but the elements were omitted. The adhesive contained the acetylene black filler instead of wood flour. These samples also remained in the RF field for varying periods of time. There was severe arcing in the glue line in contrast to the second set using elments in which there was no arcing. This demonstrates the function of the elements to reduce arcing in the glue line.

The above examples demonstrate that the use of field control elements in the glue line greatly enhance the speed and efficiency of RF curing. The patterns may be placed either directly on the substrate or on an absorbent web which will be placed in the glue line. FIGS. 19 and 20 are schematic diagrams showing two methods of continuous manufacture. In each of these diagrams an overlay is being placed on a substrate.

In FIG. 19 a striped field control element is being placed directly on the substrate. The substrate 120 is carried by a conveyor 121 through the apparatus 122 which places both the elements 123 and the adhesive 124 on the face of the substrate.

The apparatus 122 may be in one or more sections. This will depend on the type of element and whether it must dry prior to the application of the adhesive. If more than one section is used, normally the first section will apply the elements. The apparatus 122 may be flame spray or printing. It will depend on the type of element.

A face sheet 125 is placed on the substrate after the application of the adhesive. A transfer apparatus 126 is used to carry the face sheet over the substrate and place it on the substrate. An apparatus suitable for this purpose is shown in U.S. Pat. No. 3,312,327. The assembly 127 formed by the substrate 120 and the face sheet 125 is carried into an RF press 128 by conveyor 121. Here pressure and heat are applied to cure the adhesive and bond the members together. Parallel RF heating is used.

The same reference numerals are used in FIGS. 19 and 20 because most of the process is the same. The one difference is that the stripes 129 are on a film or web 130 which is placed in the glue line. The film unwinds from a roll 131 and is laid onto the substrate 120a by a roll 132. The film illustrated is an absorbent paper web having a dry adhesive within it. The adhesive cures upon the application of heat and pressure. It is also possible to use wet adhesive by placing a wet adhesive applicator between the roll 131 and the roll 132 so that wet adhesive is applied to the film 130 prior to placing it on the substrate 120a. The adhesive may be a typical thermosetting adhesive such as phenol-formaldehyde, urea-formaldehyde, or phenol-resorcinol-aldehyde. It is also possible to apply the adhesive directly to the web and substrate after the web is on the substrate. A standard adhesive applicator would be used for this purpose.

The web may be absorbent paper, cloth or any woven or nonwoven fibrous carrier of poor conductivity. Sprayed metal deposits can be placed easily, efficiently, and uniformly on a 12-lb. per 3000 square feet high-wet-strength paper. Effective conductors have also been spray deposited on loosely woven tobacco cloth having a thread count of 20 × 16 per inch.

The processes shown in FIGS. 19 and 20 are illustrative only. The addition of the field control elements is also useful in the manufacture of any laminated articles such as laminated beams, laminated decking, overlays or the manufacture of plywood.

In the manufacture of each of these by the standard lay-up system, it would be possible to use the present invention either by striping one of the mating surfaces of each of the laminae prior to lay-up or by placing a web in the glue line during the lay-up operation. In the manufacture of plywood it would be possible to stripe the interior surface of the face and back sheets and both surfaces of the core sheets or alternatively to stripe both faces of the cross-core units if a unitized core is used.

Figure 21:
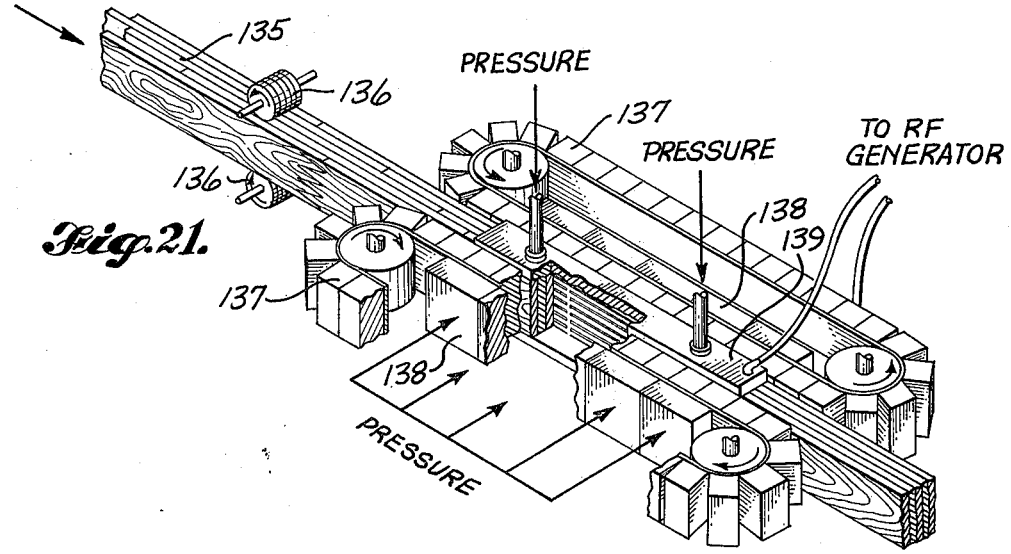
FIG. 21 is an isometric view, with portions cut away, of an apparatus for both heating and pressing laminates.

Another system for using parallel RF heating when applying pressure is shown in FIG. 21. This apparatus is described in the article "The Risborough Continuous Laminating Machine" by J.F.S. Carruthers in Wood, October 1965, pages 51-54.

Basically, the assembly 135 to be laminated is pushed by side thrust rolls 136 toward pressure conveyors 137 which carry the assembly 135 through the RF field while simultaneously applying pressure to the top and bottom of the assembly. A pressure track 138 for each of the conveyors aids in the application of pressure to the assembly. RF electrodes 139 are on each side of the assembly and apply parallel heating to the glue line. The electrodes are also under pressure.

Thus, the application of RF heat and pressure can be stepwise as shown in FIGS. 19 and 20 or continuous as shown in FIG. 21.

Another type of continuous RF press may also be used to heat and press the laminates. Its operation is illustrated in the following example.

EXAMPLE 25

Figure 22:
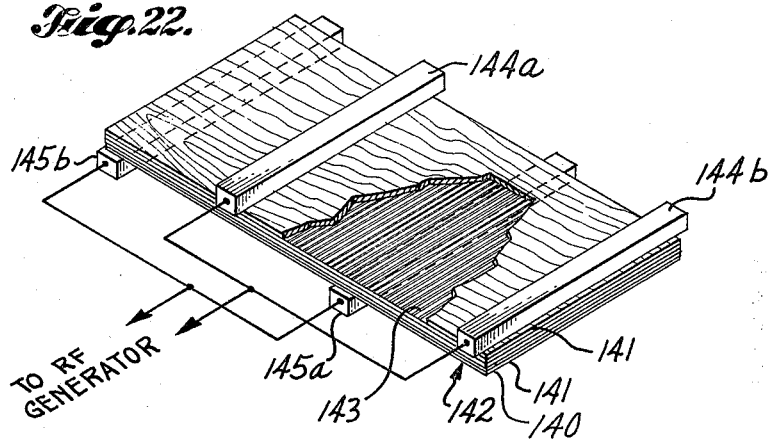
FIG. 22 is an isometric view, with portions cut away, of a modified RF heating apparatus.

In FIG. 22, a 3/16 inch center veneer 140 and four 1/10 inch veneers 141, each 20 inches by 12 inches, are stacked in a 5-ply assembly 142. Prior to stacking, metal sprayed stripes 143, ¼ inch wide and spaced ¼ inch apart, are applied to one of each of the mating faces parallel to the 12 inches dimension, and phenol-resorcinol-aldehyde adhesive having a liquid hardener is applied to the glue joints.

The set of electrodes 144 on the top face and the opposing electrodes 145 on the bottom face are staggered.

The bonding is uniform in the center area between the center opposing electrodes 144a and 145a. Wood failure occurs between the stripes, indicating good control of the electrode-magnetic field. In the outer areas, particularly in the glue lines furthest from the outer electrodes, bonding is somewhat less uniform.

Figure 23:
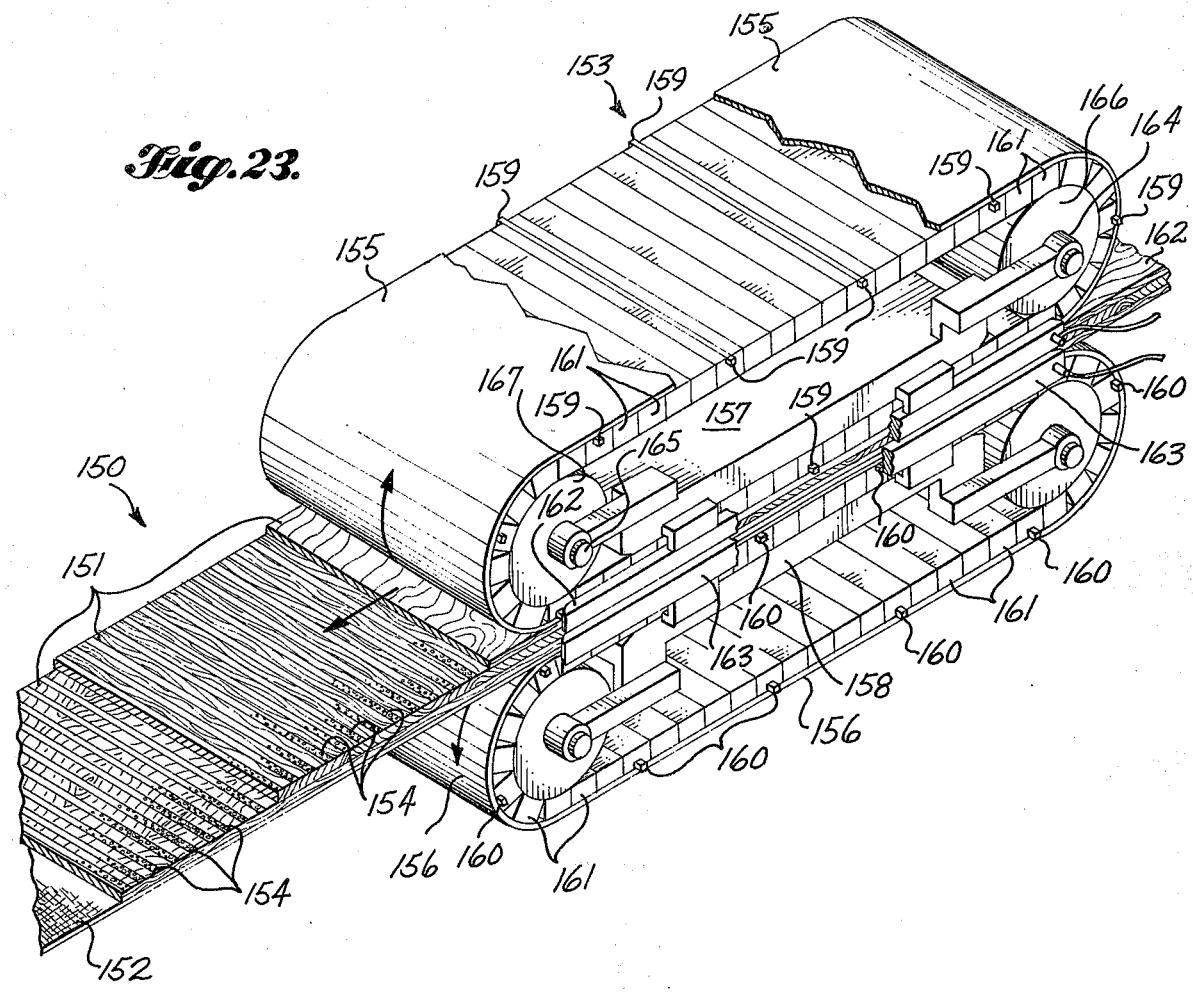
FIG. 23 is an isometric view of a modified stray field press which may be used in the practice of the present invention.

A press using this principle is shown in FIG. 23. In this figure, assemblies 150 comprising a number of laminae 151 are carried by a conveyor 152 into the heating and pressing unit 153. The stripes 154 in the glue lines of the assembly run widthwise of the material and of the conveyor.

The heating and pressing unit 153 comprises upper and lower pressure conveyors 155 and 156. Pressure tracks 157 and 158 hold the conveyors tightly against the assembly to press it during heating. A series of first electrodes 159 are spaced around the upper conveyor 155 and a series of opposing electrodes 160 are spaced around the lower conveyor 156. The electrodes are staggered so that an electrode 160 on a lower conveyor is midway between two opposed electrodes 159 on the upper conveyor. The relationship of the electrodes is identical to the relationship of the electrodes in FIG. 22. The segments 161 of the upper and lower conveyors 155 and 156 are made of insulative material so that they do not conduct electricity.

Each of the electrodes 159 and 160 extend outwardly of the spacer blocks 161 so that each electrode can contact bus bar 162 and 163, respectively, during the portion of its travel when it is in contact with an assembly 150. The bus bar 162 is attached to the axles 164 and 165 of the drive and idler rolls 166 and 167, respectively, so that the bus bar raises and lowers with the upper conveyor 155 as it is adjusted for assemblies of varying thicknesses.

It is also possible to use this invention with materials other than flat laminates. The following example demonstrates its use with either horizontal or vertical finger joints.

EXAMPLE 26

Figure 24:
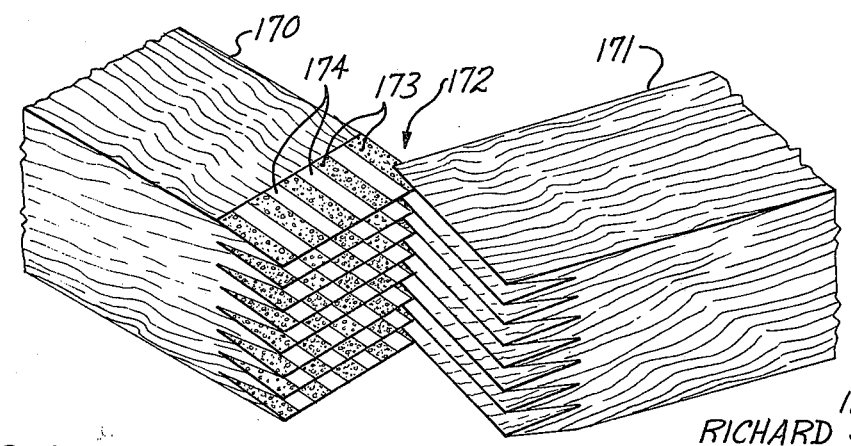
FIG. 24 is an isometric view of finger joints using the present invention.

FIG. 24 shows boards 170 and 171 which will be joined at their ends by a finger joint 172. Elements 173 are placed on the surface 174 of one of the finger joints.

Figure 25:
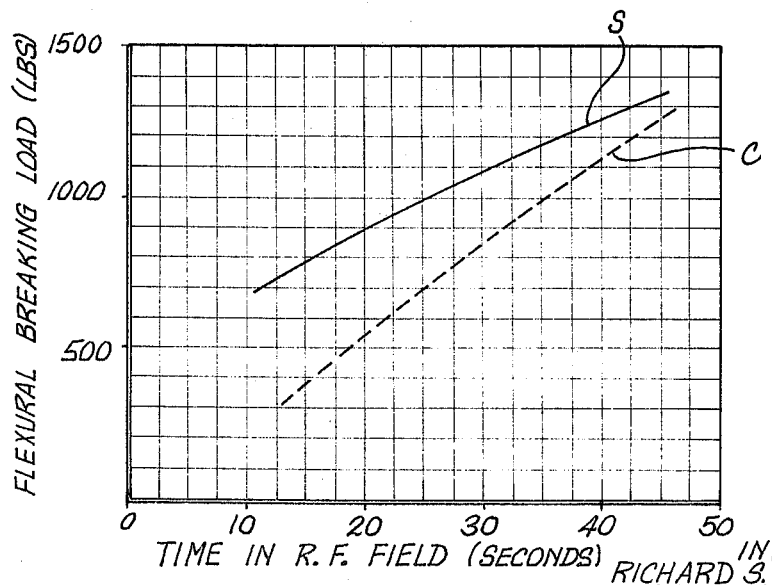
FIG. 25 is a graph showing the influence of the present invention in the bonding of finger joints.

Test sample with elements and control sample without elements were cured in an RF field for ranging periods of time using phenol-resorcinol-aldehyde phenol-resorccinol-aldehyde adhesive. Three minutes after removal from the field each of the samples was tested in flexure. FIG. 25 is a graph showing the flexural breaking load as a function of the time in the RF field in seconds. As may be seen, the samples with elements, curve S, had a higher flexural breaking load than the control samples without elements, curve C, showing that better bonding was achieved by the use of elements.

When bonding notched joints which place the elements at a remote location from the RF electrodes or place them substantially out of parallel with the electrodes, it is necessary to provide auxiliary electrodes around the joint in order to focus the field into the joint. FIGS. 26-30 illustrate this.

FIGS. 26-28 illustrate the placement of both elements and auxiliary electrodes on the female members of the joint. In each of these figures a board 200 has a notch 201 in which elements 202 are placed. FIGS. 26 and 27 illustrate the placement of the elements on the side walls 203 only of the notch 201 and FIG. 28 illustrates the placement of the elements on the inner face 204 of the notch 201 also. This latter placement of elements is preferred because it prevents arcing at the joint. When the joint is closed by inserting the male member, as shown in FIGS. 29 and 30, a substantial glue squeeze-out builds up on the innermost surface 204 and arcing develops in this area. When the elements 202 are placed on the inner face 204, as in FIG. 27, the arcing does not occur even though there is glue squeeze-out.

Each of the members 200 has electrodes 205 placed around the joint. The shape of the electrodes shown in FIGS. 26-28 reorients the RF field 90°. For this purpose it is necessary for the auxiliary electrode to have the receiving member 206 perpendicular to the original field and electrode member 207 perpendicular to the new field orientation.

The auxiliary electrode may be of the same material as the elements and may be sprayed on the substrate as in FIG. 26. The electrode then becomes an integral part of the substrate. The electrode may also be the shaped plate shown in FIG. 27 which is placed on the joint at the time of use and removed thereafter, or it may be the foil member shown in FIG. 28 which may or may not be removed from the substrate after curing.

The auxiliary electrodes may also be placed on the male member as shown in FIGS. 29 and 30. The electrodes 210 are placed on the male member 211. The electrode configuration shown does not reorient the field. In this case the elements 212 may be placed either on the female member or the male member. The former placement is shown in FIG. 29 and the latter placement is shown in FIG. 30. In either case it is preferred that elements be either on the innermost face 204 of the notch or on the end of the male member 211.

EXAMPLE 27

The elements are also useful for edge bonding. This is shown in FIG. 31. Two samples 220 of ¾ inch phenolic bound particleboard 6 inches wide by 12 inches long were prepared. Each of the samples was placed between the staggered electrodes 221 and 222 as shown. The electrodes were attached to the leads of the 2.7 kw generator.

The edge of the test sample was flame sprayed with upper and lower vertical elements 223 and 224. The elements of flame sprayed aluminum were ¼ inch wide and ¼ inch apart and the edges of the elements were spaced ⅛ inch apart. The edge of both samples was spread with a phenol-resorcinol resin with 6% paraformaldehyde and 8% wood flour.

A control with no elements was placed between the electrodes and a current of 200 milliamperes applied for 15 seconds. Immediate inspection revealed that about 20% of the edge of the control sample was gelled but still soft.

The sample with elements was treated in the same manner, placed between the electrodes and the 200 milliampere current was applied for only seven seconds. Immediate inspection revealed that 60% of the area was gelled hard and nearly cured.

What is claimed is:

1. The process of bonding members with a thermosetting adhesive in a heat generating, dielectric, radio frequency field comprising:
   locating a multiplicity of spaced apart, patterned field control elements within the glueline area between the members, said elements having a conductivity different from the adhesive and said pattern being a series of parallel stripes;
   placing the members between the electrodes of the dielectric heat generator; and
   applying the dielectric field parallel to the plane of the glueline area and perpendicular to the direction of the stripes for a time at least sufficient to induce bonding in the areas between the stripes.

2. The process of claim 1 in which the stripes are discontinuous along the length of the pattern.

3. The process of claim 1 in which the stripes are spaced equidistantly from each other.

4. The process of claim 3 in which the stripes are of equal width.

5. The process of claim 3 in which there are stripes of different widths.

6. The process of claim 1 in which spaces between the stripes are of different widths.

7. The process of claim 6 in which the stripes are of equal width.

8. The process of claim 6 in which the stripes are of different widths.

9. The process of claim 1 in which the members are wood laminae.

10. The process of claim 9 in which the elements are on one of said laminae.

11. The process of claim 9 in which the elements are carried into the glueline on a permeable web.

12. The process of claim 1 in which the elements are a flame sprayed metal deposit.

13. The process of claim 1 in which the elements are particles of a conductive material in a binder.

14. The process of claim 13 in which the binder is a thermosetting adhesive.

15. The process of claim 13 in which the particles are a metal.

16. The process of claim 13 in which the particles are amorphous carbon.

17. The process of claim 1 in which the elements are deposits of an ionizable acid, base or salt.

18. The process of claim 17 in which the elements are sodium hydroxide and a thickener.

19. The process of claim 1 in which the adhesive cures over the elements after being removed from the field.

* * * * *

UNITED STATES PATENT OFFICE
CERTIFICATE OF CORRECTION

PATENT NO. : 3,888,715
DATED : June 10, 1975
INVENTOR(S) : RICHARD S. FRASER and RONALD J. McCONNEL It is certified that error appears in the above-identified patent and that said Letters Patent are hereby corrected as shown below:

Richard S. Fraser and Ronald J. McConnel are the inventors, as changed by the Declaration under Rule 45; delete the names Cecil J. Allison, Jr., Richard W. Caster, Roland E. Kribich, and Paul Y. Jone;

in col. 1, line 22, "these molecules" should read --these into molecules--;

in column 2, line 30, "lines" should read --line--;

in column 3, line 53, "stripped" should read --striped--;

in column 3, line 61, "strips" should read --stripes--;

in column 5, line 21, "buring" should read --burning--;

in column 5, line 51, "increase" should read --increases--;

in column 5, line 53, "width" should read --widths--;

in column 6, line 5, "electrode" should read --electrodes--;

in column 6, line 23, "strips" should read --stripes--;

in column 6, line 24, "strips" should read --stripes--;

in column 6, line 45, "strip" should read --stripe--;

in column 6, line 57, "midpoint." should read --midpoint by decreasing the spacing between elements at the midpoint.--;

in column 7, line 3, "this will" should read --this term will--;

UNITED STATES PATENT OFFICE
CERTIFICATE OF CORRECTION

PATENT NO. : 3,888,715
DATED : June 10, 1975
INVENTOR(S) : RICHARD S. FRASER and RONALD J. McCONNEL It is certified that error appears in the above-identified patent and that said Letters Patent are hereby corrected as shown below:

in column 7, line 29, "strips" should read --stripes--;

in column 8, line 23, "deposite" should read --deposit--;

in column 8, line 34, "cooper" should read --copper--;

in column 9, line 26, "temperatueres" should read --temperatures--;

in column 9, line 33, "flue" should read --glue--;

in column 9, line 35, "discontinuous to" should read --discontinuous as to--;

in column 9, line 58, "particular thickner" should read --particulate thickener--;

in column 10, line 20, "waterborene" should read --waterborne--;

in column 11, line 20, "adhesives" should read --adhesive--;

in column 11, line 21, "type or" should read --type of--;

in column 11, line 23, "strips" should read --stripes--;

in column 11, line 29, "strips" should read --stripes--;

in column 12, line 2, "strips" should read --stripes--;

in column 18, line 6, "elments" should read --elements--;

in column 20, line 26, "phenol-", second instance, should be deleted; and in column 20, line 27, "resorccinol-aldehyde" should be deleted.

Signed and Sealed this sixteenth Day of December 1975

[SEAL]

Attest:

RUTH C. MASON
Attesting Officer

C. MARSHALL DANN
Commissioner of Patents and Trademarks